US005466195A

United States Patent [19]

Nogle et al.

[11] Patent Number: 5,466,195
[45] Date of Patent: Nov. 14, 1995

[54] INPUT COMPOUNDING TORQUE CONVERTER

[75] Inventors: Thomas D. Nogle, Troy; Willem S. Haven, Waterford; Tomasz K. Kietlinski, Grosse Pointe, all of Mich.

[73] Assignee: Chrysler Corporation, Highland Park, Mich.

[21] Appl. No.: 282,249

[22] Filed: Jul. 29, 1994

Related U.S. Application Data

[63] Continuation-in-part of Ser. No. 123,768, Sep. 17, 1993, abandoned, which is a continuation of Ser. No. 960,326, Oct. 13, 1992, abandoned.

[51] Int. Cl.$^6$ ....................................................... F16H 3/44
[52] U.S. Cl. ........................................................... 475/55
[58] Field of Search ................................. 475/49, 55, 59, 475/65

[56] References Cited

U.S. PATENT DOCUMENTS

| | | | |
|---|---|---|---|
| 476,101 | 5/1892 | Thomson | 475/342 |
| 1,417,797 | 5/1922 | Cook et al. | 475/342 |
| 1,435,821 | 11/1922 | Dorsey | 475/339 |
| 1,819,606 | 8/1931 | Jones | 475/108 |
| 2,135,282 | 11/1938 | Fottinger | 475/36 |
| 2,178,613 | 11/1939 | Seeck | 475/226 |
| 2,270,581 | 1/1942 | Clarke | 477/126 |
| 2,302,714 | 11/1942 | Pollard | 475/49 |
| 2,324,733 | 7/1943 | Smirl | 475/55 |
| 2,334,394 | 11/1943 | Dodge | 475/51 |
| 2,388,849 | 11/1945 | Jandasek | 475/55 |
| 2,391,648 | 12/1945 | Seybold | 475/56 |
| 2,645,137 | 7/1953 | Roche | 475/54 |
| 2,720,124 | 10/1955 | Polomski | 475/137 |
| 2,726,557 | 12/1955 | Ackerman | 477/64 |
| 2,734,399 | 2/1956 | Christenson | 477/64 |
| 2,749,775 | 6/1956 | Simpson | 475/65 |
| 2,791,919 | 5/1957 | Wildhaber | 475/90 |
| 2,834,229 | 5/1958 | Graybill | 475/99 |
| 2,890,601 | 6/1959 | Forster | 475/54 |
| 2,894,415 | 7/1959 | Miller | 475/55 |
| 2,950,632 | 8/1960 | Miller | 74/720 |
| 2,978,929 | 4/1961 | Roberts | 475/89 |

(List continued on next page.)

FOREIGN PATENT DOCUMENTS

| | | |
|---|---|---|
| 835497 | 12/1938 | France . |
| 2812716 | 11/1979 | Germany . |
| 55-119257 | 9/1980 | Japan . |

OTHER PUBLICATIONS

The Buick Flight Pitch Dynaflow; Forest McFarland and C. S. Chapman; Society of Automotive Engineers, Mar. 4–6, 1958.
The New Dynaflow Automatic Transmission, R. J. Gorsky; Society of Automotive Engineers, Jan. 9–13, 1956.
The New Buick Special Automatic Transmission—The Dual Turbine Drive, C. S. Chapman and R. J. Gorsky; Society of Automotive Engineers; Jan. 9–13, 1961.
Clutches and Transmissions, *Automobile Engineer*, Nov. 1962, vol. 241, 54, (1964, Nov.), 12. 470/479.

*Primary Examiner*—Dirk Wright
*Attorney, Agent, or Firm*—Christopher A. Taravella

[57] ABSTRACT

An input compounding torque converter is provided for converting and multiplying torque from a prime mover to an input shaft for a transmission. The input compounding torque converter includes an impeller operatively connected for rotation with a prime mover. The input compounding torque converter also includes a turbine fluidly connected in driving relationship with the impeller for receiving torque from the impeller and planetary gearset interconnecting the turbine and an input shaft of a transmission for multiplying torque from the turbine to the input shaft. The planetary gearset includes an annulus gear connected to the turbine, a planetary carrier connected to the input shaft, a sun gear, and a plurality of planetary pinion gears rotatably supported on the planetary carrier and engaging the sun and annulus gears. The input compounding torque converter also includes first and second one way clutches which are radially spaced with respect to one another and including a stationary reaction member having an intermediate portion disposed between the radially spaced first and second one way clutches.

20 Claims, 3 Drawing Sheets

U.S. PATENT DOCUMENTS

| | | | |
|---|---|---|---|
| 2,995,956 | 8/1961 | Moore | 475/34 |
| 3,041,891 | 7/1962 | Black et al. | 475/34 |
| 3,041,892 | 7/1962 | Schjolin | 475/48 |
| 3,090,255 | 5/1963 | Smirl et al. | 475/45 |
| 3,217,563 | 11/1965 | Simpson | 475/54 |
| 3,237,481 | 3/1966 | Kelley | 475/38 |
| 3,238,814 | 3/1966 | Jandasek | 74/718 |
| 3,263,525 | 8/1966 | Jandasek | 475/40 |
| 3,263,527 | 8/1966 | Stockton | 475/50 |
| 3,292,456 | 12/1966 | Saari | 475/226 |
| 3,296,894 | 1/1967 | Moan | 475/267 |
| 3,352,373 | 11/1967 | Tuck | 180/243 |
| 3,354,746 | 11/1967 | Paredes | 475/49 |
| 3,406,593 | 10/1968 | Vesey | 475/249 |
| 3,528,321 | 9/1970 | Harmon et al. | 475/41 |
| 3,706,239 | 12/1972 | Myers | 475/226 |
| 4,014,223 | 3/1977 | Pierce, Jr. | 475/55 |
| 4,082,475 | 4/1978 | Kuder | 408/125 |
| 4,105,102 | 8/1978 | Nels | 192/106.1 |
| 4,240,532 | 12/1980 | Blomquist | 192/3.28 |
| 4,280,469 | 7/1981 | Ganoung | 123/568 |
| 4,289,048 | 9/1981 | Mikel et al. | 477/64 |
| 4,342,298 | 8/1982 | Ganoung | 123/344 |
| 4,383,456 | 5/1983 | Ganoug | 477/100 |
| 4,398,436 | 8/1983 | Fisher | 475/47 |
| 4,483,212 | 11/1984 | Ohtsuka | 475/54 |
| 4,505,169 | 3/1985 | Ganoung | 477/100 |
| 4,592,250 | 6/1986 | Plasencia et al. | 475/51 |
| 4,756,210 | 7/1988 | Franklin et al. | 475/32 |
| 4,774,858 | 10/1988 | Ganoung | 475/32 |
| 4,867,290 | 9/1989 | Macdonald et al. | 192/328 |
| 4,889,012 | 12/1989 | Dull | 475/53 |
| 4,964,318 | 10/1990 | Ganoung | 477/110 |
| 5,045,035 | 9/1991 | Ganoung | 475/42 |

|  | FIRST | SECOND | THIRD | FOURTH |
|---|---|---|---|---|
| BASE THREE-SPEED | 2.69 | 1.55 | 1.00 | — |
| WITH 1.37:1 COMPOUNDER | 3.69 | 2.12 | 1.37 | 1.00 |
| OR | 3.69 | 2.12 | 1.55 | 1.00 |
| OR | 3.69 | 2.69 | 1.55 | 1.00 |
| WITH 1.58:1 COMPOUNDER | 4.25 | 2.45 | 1.58 | 1.00 |
| OR | 4.25 | 2.45 | 1.55 | 1.00 |
| OR | 4.25 | 2.69 | 1.55 | 1.00 |

FIG. 2.

INPUT COMPOUNDING TORQUE CONVERTER

CROSS-REFERENCE TO RELATED APPLICATION

This is a continuation-in-part of application Ser. No. 08/123,768, filed Sep. 17, 1993, which is a continuation of Ser. No. 07/960,326, filed Oct. 13, 1992.

BACKGROUND OF THE INVENTION

1. Field of the Invention

The present invention relates generally to a transmission primarily intended for motor vehicle use, and more particularly to a torque converter for a transmission.

2. Description of the Related Art

Generally speaking, land vehicles require three basic components. These components include a power plant (such as an internal combustion engine), a power train and wheels. The power train's main component is typically referred to as the "transmission." Engine torque and speed are converted in the transmission in accordance with the tractive-power demand of the vehicle. A conventional automatic transmission includes a hydrodynamic torque converter to transfer engine torque from the engine crankshaft to a rotatable input member of the transmission through fluid-flow forces. Examples of such torque converters are disclosed in U.S. Pat. Nos. 4,240,532 and 4,289,048 which are assigned to the same assignee as the present invention.

One disadvantage of the above patented torque converters is that the transmission torque capacity is not fully utilized when mated with lower torque engines. Another disadvantage is that there is no torque compounding or multiplication for the engine input above the torque converter's coupling point speed. Yet another disadvantage is that there is no means for making a ratio shift (upshift/downshift) within these units.

SUMMARY OF THE INVENTION

It is, therefore, one object of the present invention to provide an input compounding, or two speed, torque converter for a vehicle transmission.

It is another object of the present invention to provide a relatively low-cost input compounding torque converter.

It is yet another object of the present invention to provide a relatively compact input compounding torque converter.

It is still another object of the present invention to provide a relatively light-duty input compounding torque converter.

It is a further object of the present invention to provide an input compounding torque converter which allows low torque engines to better match with higher capacity transmissions.

It is yet a further object of the present invention to provide an input compounding torque converter with an additional, selectable, geartrain ratio when used with any suitable base-speed transmission.

It is a still further object of the present invention to provide for reversed power flow so that the power plant can be used to decelerate, or brake, the vehicle.

To achieve the foregoing objects, the present invention is an input compounding torque converter for converting and multiplying torque from a prime mover to an input shaft of a transmission. The input compounding torque converter includes impeller means operatively connected for rotation with a prime mover. The input compounding torque converter also includes turbine means fluidly connected in driving relationship with the impeller means for receiving torque from the impeller means and planetary gear means interconnecting the turbine means and an input shaft of a transmission for multiplying torque from the turbine means to the input shaft. The planetary gear means includes an annulus gear connected to the turbine means, a planetary carrier connected to the input shaft, a sun gear, and a plurality of planetary pinion gears rotatably supported on the planetary carrier and engaging the sun and annulus gears. The input compounding torque converter also includes two overrunning or one way clutches to provide torque reactions for the stator and for the sun gear in one direction while allowing each to rotate freely and independently in the opposite direction. Furthermore, the planetary carrier is connectable directly to the prime mover by way of a clutch, commonly referred to as "lock-up", such that clutch engagement provides an upshift to direct drive through the input compounding torque converter, bypassing both hydrodynamic and mechanical torque multiplication.

One advantage of the present invention is that the input compounding torque converter multiplies or compounds engine output or torque for full use of the transmission torque capacity with smaller output engines. Another advantage of the present invention is that the input compounding torque converter is relatively compact and fits into existing space or envelope of present transmissions, thereby eliminating any vehicle adaptation. Yet another advantage of the present invention is that the input compounding torque converter is relatively light-duty and low-cost. Still another advantage of the present invention is that the input compounding torque converter provides power train flexibility by allowing an additional geartrain ratio when used with a lower base speed transmission. A further advantage of the present invention is that the input compounding torque converter provides an added geartrain ratio which improves vehicle performance and fuel economy. Yet a further advantage of the present invention is that the input compounding torque converter provides a direct ratio top gear (not an overdrive ratio) when upshifted which results in less noise and parasitic losses compared to an overdrive top gear. A still further advantage of the present invention is provision for driver-choice of coast free-wheeling (unlocked) or maximum engine braking (locked-up).

Other objects, features and advantages of the present invention will be readily appreciated as the same becomes better understood after reading the following description taken in conjunction with the accompanying drawings.

BRIEF DESCRIPTION OF THE DRAWINGS

FIG. 2 is a chart which summarizes example gear ratio combinations for the input compounding torque converter of FIG. 1 when used in combination with an example three-speed automatic transmission.

DESCRIPTION OF THE PREFERRED EMBODIMENT(S)

Figure 1:
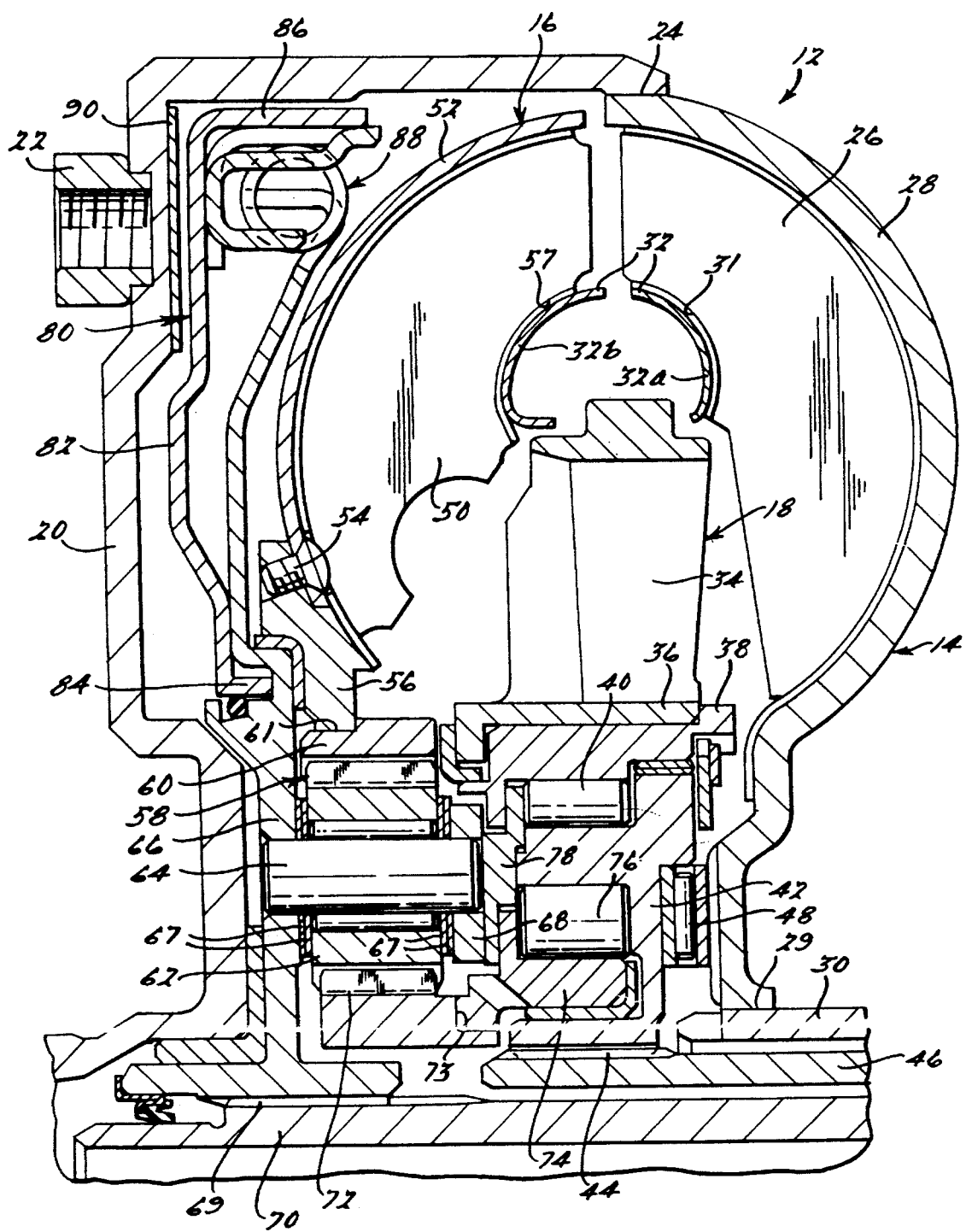
FIG. 1 is a sectional elevational view of an input compounding torque converter, according to the present invention, illustrated in operational relationship with a transmission.

Referring to FIG. 1, a transmission such as an automatic transmission according to one embodiment of the present invention is partially shown. The transmission is adapted for use in a vehicle (not shown) such as an automotive vehicle. However, it should be appreciated that the principles of the present invention may be employed in other types of vehicles and devices.

The transmission includes an input compounding torque converter, according to the present invention and generally indicated at 12, for transmitting power from a rotating crankshaft (not shown) of a prime mover such as an engine (not shown) to an input member 70 of any suitable ongoing transmission. The transmission may then subsequently distribute this power to one or more wheels (not shown) of the vehicle. It should be appreciated that the input compounding torque converter 12 may be used in an automatic transmission system of the type disclosed in U.S. Pat. No. 4,875,391, assigned to the same assignee as the present invention. It should also be appreciated that the input compounding torque converter 12 may be used in other types of transmissions such as continuously variable transmissions.

As illustrated in FIG. 1, one embodiment of the input compounding torque converter 12 generally includes an impeller assembly 14, turbine assembly 16, a stator assembly 18, compounding gear assembly 58 and lock-up clutch assembly 80 to be described. Power is transmitted from the rotating crankshaft of the engine to a front cover member 20 of the impeller assembly 14. The front cover member 20 may include a plurality of input drive lugs or threaded connectors 22. A rotatable plate member (not shown) is secured to the front cover member 20 by suitable fastening means such as bolts (not shown) which are received in the connectors 22 as is commonly known in the art. The front cover member 20 is secured, such as by welding at 24, to the impeller assembly 14 of the input compounding torque converter 12.

The impeller assembly 14 is fluidly connected in torsional flow relationship in a known manner with the turbine assembly 16 and the stator assembly 18. The impeller assembly 14 includes a plurality of circumferentially spaced impeller blades 26 connected to the inside of an impeller shell 28. The impeller shell 28 is secured, such as by welding at 29, to an impeller hub or pump drive shaft 30. The impeller hub 30 is drivingly engaged to a pump (not shown) from which fluid is supplied to the input compounding torque converter 12. The impeller blades 26 have an arcuate inner portion 31 disposed about one half 32a of a split torus ring 32 which reduces fluid turbulence within the torque converter 12.

The stator assembly 18 includes a plurality of circumferentially spaced stator vanes 34 which are connected at their inner end to a stator plate 36. The stator plate 36 is mounted on a stator hub 38. The stator hub 38 has a camming surface mounted about a plurality of rollers 40 which act as a free wheel or one-way clutch to allow the stator vanes 34 to rotate in the same direction as the impeller assembly 14 and turbine assembly 16 during both converter coupling and lockup operation. The rollers 40 are mounted on a race surface of a stationary stator reaction member 42. The stator reaction member 42 is connected, such as by a spline connection 44, to a stationary reaction shaft 46. An annular thrust bearing 48 is disposed between the stator reaction member 42 and the impeller shell 28. It should be appreciated that other suitable types of one-way clutches may be used. It should also be appreciated that other bushings, retainer members and the like may be used and are illustrated in FIG. 1 although not specifically described. The turbine assembly 16 includes a plurality of circumferentially spaced turbine blades 50 which are connected to the inside of a turbine shell 52. The turbine shell 52 is secured, by suitable means such as screws 54, to a turbine hub member 56. The turbine blades 50 have an arcuate inner portion 57 disposed about the other half 32b of the split torus ring 32 previously described.

The compounding gear assembly, generally indicated at 58, multiplies or compounds torque from the turbine assembly 16 to an input member 70 for the ongoing transmission. The compounding gear assembly 58 includes an annulus gear 60 secured, such as by welding at 61, to the turbine hub member 56. The compounding gear assembly 58 also includes a plurality of circumferentially spaced planetary pinion gears 62 mounted about planetary pinion shafts 64 which are connected to a planetary carrier 66. The planetary pinion gears 62, along with thrust washers 67, are held on the planetary pinion shafts 64 via plate member 68. The planetary carrier 66 is drivingly connected, such as by a spline connection 69, to a rotatable input member or shaft 70 for the ongoing transmission. The compounding gear assembly 58 further includes a sun gear 72 engaging the pinion gears 62 and is secured, such as by welding at 73, to a sun hub member 74. The sun hub member 74 has a camming surface adjacent a plurality of rollers 76 mounted on a race surface of the stator reaction member 42 which act as a free wheel or oneway clutch to allow the sun gear 72 to rotate in the same direction as the turbine assembly 16 during lock-up operation in both driving and engine braking. A retainer member 78 is disposed between the sun hub member 74 and stator hub member 38 to retain the rollers 40 and 76 to the stator reaction member 42. It should be appreciated that the annulus gear 60 may be integral with the turbine assembly 16. It should also be appreciated that the compounding gear assembly 58 has a predetermined gear ratio such as 1.45:1.

When applied, the lock-up clutch assembly, generally indicated at 80, prevents slip between the rotating crankshaft of the engine and the planetary carrier 66 of the compounding gear assembly 58. The lock-up clutch assembly 80 includes an annular piston member 82 having an inner flange portion 84 slidingly and sealingly mounted for axial movement on the planetary carrier 66 of the compounding gear assembly 58. The piston member 82 has an outer flange portion 86 connected to a torsional isolation mechanism, generally indicated at 88, which is drivingly connected to the planetary carrier 66. Such a torsional isolation mechanism is disclosed in U.S. Pat. Nos. 4,240,532 and 4,289,048, the disclosures of both patents are hereby incorporated by reference. The lock-up clutch assembly 80 further includes an annular disc-shaped frictional element or lock-up disc 90 carried proximate the outer periphery of the front cover member 20 for engagement with a cooperating portion of the piston member 82. It should be appreciated that the torsional isolation mechanism 88 is optional and may not be needed for "smooth-running" power sources or if "partial lock" is used (e.g., controlled, slight slip).

OPERATION OF THE TORQUE CONVERTER

Rotation of the crankshaft of the engine causes the front cover member 20 to rotate with it due to the connection with the plate member (not shown). Since the front cover member 20 is welded at 24 to the impeller shell 28 of the impeller assembly 14, the impeller assembly 14 also rotates with the crankshaft. The fluid within the impeller assembly 14 is set into motion by the rotation of the impeller assembly 14 and kept filled by the fluid pressure from a pump (not shown). The impeller blades 26 start to carry the fluid around with them. As the fluid is spun around by the impeller blades 26, it is thrown outward by centrifugal force and into the turbine assembly 16 at an angle. The fluid strikes the turbine blades 50 of the turbine assembly 16, thus imparting torque, or turning effort to the turbine assembly 16 and causing the turbine shell 52 and the turbine assembly 16 to rotate. Since the turbine shell 52 is connected by screws 54 to the turbine hub 56 which is, in turn, connected to the annulus gear 60 of the compounding gear assembly 58, the annulus gear 60 rotates with the turbine assembly 16.

During normal downshifted operation of the input compounding torque converter 12, the lock-up piston 82 is not applied. Rotation of the annulus gear 60 causes the planetary pinion gears 62 to rotate, in turn, causing rotation of the planetary carrier 66. Since the planetary carrier 66 is splined at 69 to the input shaft 70, the input shaft 70 rotates due to rotation of the planetary carrier 66. Thus, torque is imparted to the input shaft 70 via the compounding gear assembly 58. It should be appreciated that the stator blades 34 and sun gear 72 are held stationary via the rollers 40 and 76, stator reaction member 42 and stationary reaction shaft 46.

However, during normal upshifted operation of the input compounding torque converter 12, the lock-up piston 82 is applied. Fluid pushes the lock-up piston 82 against the front cover member 20 with the friction disc 90 sandwiched between the two elements. The flow of power or engine torque is then transmitted through the front cover member 20, the lock-up piston 82 and torsional isolation mechanism 88, in turn, to the planetary carrier 66. Rotation of the planetary carrier 66 causes the sun gear 72 to free wheel via the rollers 76. Thus, the turbine assembly 16, planetary carrier 66 and input shaft 70 rotate together. It should be appreciated that the stator assembly 18 will also free wheel. It should also be appreciated that the flow of power is reversed during engine braking.

As illustrated in FIG. 2, a chart of example gear ratio combinations is shown for a transmission such as a base three-speed automatic transmission. The compounding gear assembly 58 may have, for example, either a 1.37 to 1 or 1.58 to 1 gear ratio. It should be appreciated that all six ratios may be used in a variety of driver- or computer-selected four speed shift patterns.

Figure 3:
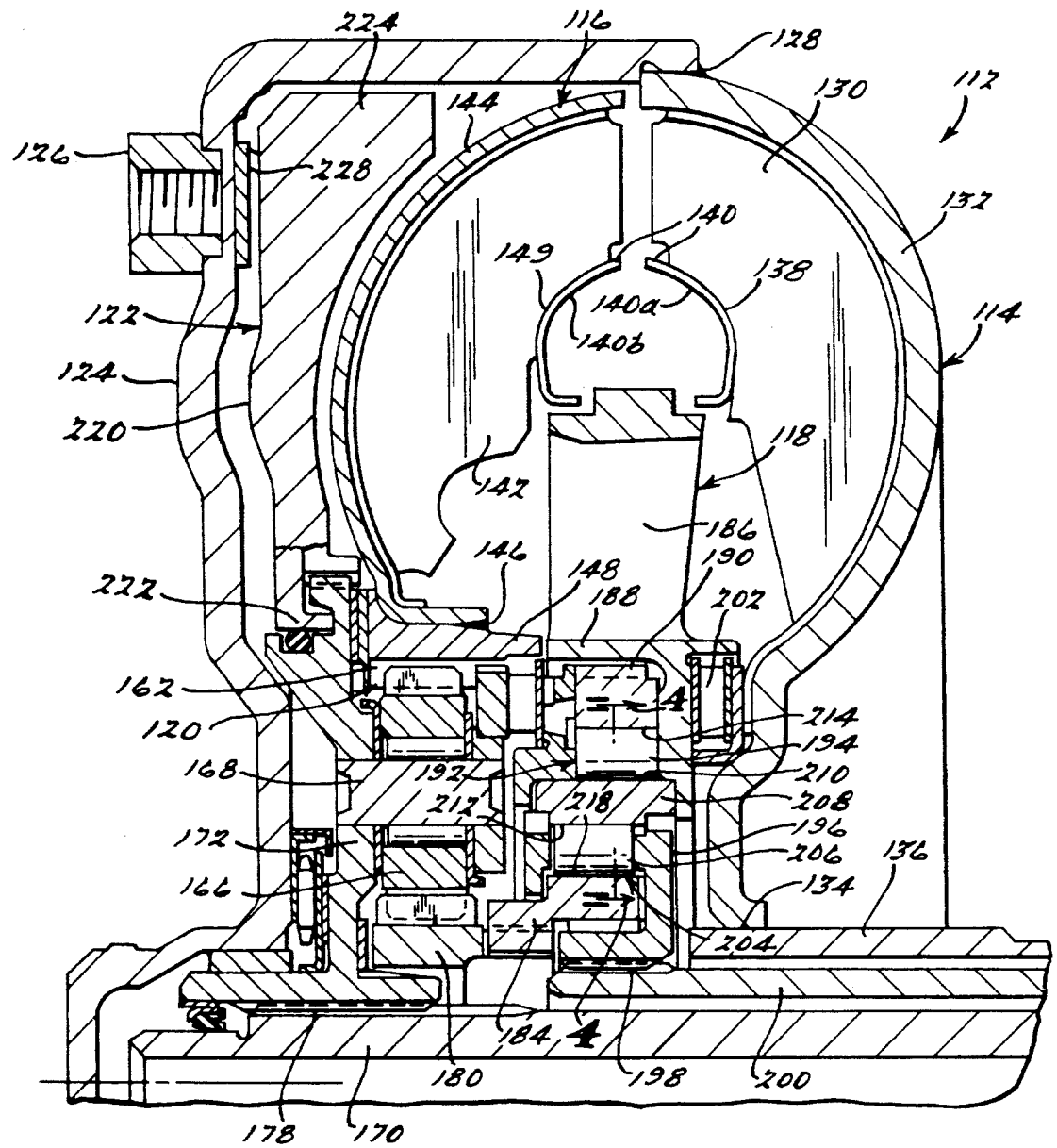
FIG. 3 is a sectional elevational view of another input compounding torque converter, according to the present invention, illustrated in operational relationship with a transmission.

As illustrated in FIG. 3, another embodiment of the input compounding torque converter 12 is generally shown at 112. The input compounding torque converter 112 generally includes an impeller assembly 114, a turbine assembly 116, a stator assembly 118, a planetary or compounding gear assembly 120 and a lock-up clutch assembly 122 each of which will be described in further detail below. Power is transmitted from the rotating crankshaft of the engine to a front cover member 124 of the impeller assembly 114. The front cover member 124 may include a plurality of input drive lugs or threaded connectors 126. A rotatable plate member (not shown) is secured to the front cover member 124 by suitable fastening means such as bolts (not shown) which are received in the connectors 126 as is commonly known in the art. The front cover member 124 is secured, such as by welding at 128, to the impeller assembly 114 of the input compounding torque converter 112.

The impeller assembly 114 is operatively connected for rotation with the prime mover and is fluidly connected in torsional flow relationship in a known manner with the turbine assembly 116 and the stator assembly 118. The impeller assembly 114 includes a plurality of circumferentially spaced impeller blades 130 connected to the inside of an impeller shell 132. The impeller shell 132 is secured, such as by welding at 134, to an impeller hub or pump drive shaft 136. The impeller hub 136 is drivingly engaged to a pump (not shown) from which fluid is supplied to the input compounding torque converter 112. The impeller blades 130 have an arcuate inner portion 138 disposed about one half 140a of a split torus ring 140 which reduces fluid turbulence within the torque converter 112.

The turbine assembly 116 includes a plurality of circumferentially spaced turbine blades 142 which are connected to the inside of a turbine shell 144. The turbine shell 144 is secured, by suitable means such as welding at 146, to a turbine hub member 148. The turbine blades 142 have an arcuate inner portion 149 disposed about the other half 140b of the split torus ring 140 previously described.

The compounding gear assembly 120 multiplies or compounds torque from the turbine assembly 116 to an input member 170 for the ongoing transmission. The compounding gear assembly 120 includes an annulus gear 162 formed on an inner surface of the turbine hub member 148. The compounding gear assembly 120 also includes a plurality of circumferentially spaced planetary pinion gears 166 mounted about planetary pinion shafts 168 which are connected to a planetary carrier 172. The planetary pinion gears 166, along with thrust washer 174, are held on the planetary pinion shafts 168 via the planetary carrier 172. The planetary carrier 172 is drivingly connected, such as by a spline connection 178, to a rotatable input member or shaft 170 for the ongoing transmission. The compounding gear assembly 120 further includes a sun gear 180 engaging the pinion gears 166. The sun gear 180 is lugged to a race member 184 of a one way clutch 206 to be described. It should be appreciated that the compounding gear assembly 120 has a predetermined gear ratio such as 1.45:1.

The stator assembly 118 includes a plurality of circumferentially spaced stator vanes 186 which are connected at their inner end to a stator hub 188. The stator hub 188 is mounted on a stator cam 190 of a one way clutch 192 to be described.

The input compounding torque converter 112 also includes a first one way clutch, generally indicated at 192, for holding stationary the stator hub 188 against rotation in the direction opposite of the impeller assembly 114 and turbine assembly 116 and allowing freewheeling motion of the stator hub 188 in the same direction as the impeller assembly 114 and turbine assembly 116 during both converter coupling and lock-up operation as will be discussed in greater detail later. The first one way clutch 192 includes a plurality of rollers 194. The stator cam 190 is mounted about the rollers 194. The rollers 194 are mounted on a stationary stator reaction member 196. The stator reaction member 196 is connected, such as by a spline connection 198, to a stationary reaction shaft 200. An annular thrust bearing 202 is disposed between a portion of the stator hub 188 and the impeller shell 132.

The input compounding torque converter 112 further includes a second one way clutch, generally indicated at 204, for holding stationary the sun gear 180 against rotation in a direction opposite of the impeller assembly 114 and turbine assembly 116 and allowing freewheeling motion of the sun gear 180 in the same direction as the impeller assembly 114 and turbine assembly 116 during lock-up operation in both driving and engine braking. The second one way clutch 204 includes a plurality of rollers 206 spaced radially with respect to the rollers 194 of the first one way clutch 192. The stationary reaction member 196 includes an intermediate portion 208 disposed between the radially spaced rollers 194,206 of the first and second one way clutches 192,204, respectively. The intermediate portion 208 provides a race surface 210 and a sun gear cam surface 212 corresponding to the rollers 194 and 206 of the first and second one way clutches 192 and 204, respectively.

Figure 4:
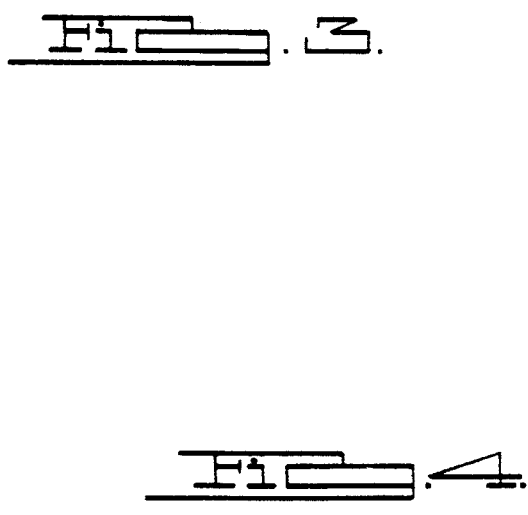
FIG. 4 is a sectional view taken along lines 4—4 of FIG. 3.

As illustrated in FIG. 4, the first one way clutch 192 includes a stator camming surface 214 disposed opposite the first race surface 210 on the intermediate portion 208 with the rollers 194 disposed therebetween. The stator camming surface 214 prevents rotation of the stator hub 188 in the opposite direction of rotation of the impeller assembly 114 and allows freewheeling motion of the stator hub 188 in the same direction as the impeller assembly 114. The rollers 194 in the first one way clutch 192 are urged, such as by leaf springs 216, into engagement with the stator camming surfaces 214 to hold the stator hub 188 against rotation as has been described. The rollers 194 are moveable out of engagement with the stator camming surface 214 and against the springs 216 to allow the freewheeling motion of the stator hub 188 in the opposite direction.

Similarly, the second one way clutch 206 includes the sun gear camming surface 212 which is disposed opposite the first race surface 210 on the intermediate portion 208 and a second race surface 218 disposed on the race member 184 with the rollers 206 disposed therebetween. The sun gear camming surface 212 is similar to that of the stator camming surface 214. The sun gear camming surface 212 prevents rotation of the sun gear 180 in the direction opposite of the impeller assembly 114 and allows freewheeling motion of the sun gear 180 in the same direction as the impeller assembly 114. The rollers 206 of the second one way clutch 204 are urged, such as by leaf springs 220 similar to the springs 216, into engagement with the sun gear camming surface 212 to hold the sun gear 80 against rotation in a direction opposite the impeller 14. However, the rollers 206 are moveable out of engagement with the sun gear camming surface 212 and against the leaf springs 220 to allow freewheeling motion of the sun gear 180 in the same direction as the impeller assembly 114. It should be appreciated that other suitable types of one-way clutches may be used. It should also be appreciated that other bushings, retainer members and the like may be used and are illustrated in FIG. 3 although not specifically described.

The torque converter 112 further includes the lock-up clutch assembly 122 for locking and unlocking the planetary carrier 172 and the input shaft 170 to the prime mover. The lock-up clutch assembly 122 provides a single path for transmitting torque from the prime mover to the input shaft 170 through the planetary carrier 172 during locking operation. When applied, the lock-up clutch assembly 122 prevents slip between the rotating crankshaft of the engine and the planetary carrier 172 of the compounding gear assembly 120.

The lock-up clutch assembly 122 has a structure similar to the lock-up clutch assembly 80 of FIG. 1. The lock-up clutch assembly 122 includes an annular piston member 220 operatively interconnected to the planetary carrier 172 and moveable between engaged and disengaged positions relative to the front cover 124. More specifically, the piston member 220 has an inner flange portion 222 slidingly and sealingly mounted for axial movement on the planetary carrier 172 of the compounding gear assembly 120. The piston member 220 has an outer flange portion 224 connected to a torsional isolation mechanism (not shown) which is drivingly connected to the planetary carrier 172. The lock-up clutch assembly 122 further includes an annular disc-shaped frictional element or lock-up disc 228 carried proximate the inner periphery of the front cover member 124 for engagement with a cooperating portion of the piston member 220.

Referring to FIGS. 3 and 4, rotation of the crankshaft of the engine causes the front cover member 124 to rotate with it due to the connection with the plate member (not shown). Since the front cover member 124 is welded at 128 to the impeller shell 132 of the impeller assembly 114, the impeller assembly 114 also rotates with the crankshaft. The fluid within the impeller assembly 114 is set into motion by the rotation of the impeller assembly 114 and kept filled by the fluid pressure from a pump (not shown). The impeller blades 130 start to carry the fluid around with them. As the fluid is spun around by the impeller blades 130, it is thrown outward by centrifugal force and into the turbine assembly 116 at an angle. The fluid strikes the turbine blades 142 of the turbine assembly 116, thus imparting torque, or turning effort to the turbine assembly 116 and causing the turbine shell 144 and the turbine assembly 116 to rotate. Since the turbine shell 144 is connected to the turbine hub 148 which is, in turn, connected to the annulus gear 162 of the compounding gear assembly 120, the annulus gear 162 rotates with the turbine assembly 116.

During normal downshifted operation of the input compounding torque converter 112, the lock-up piston 220 is not applied. Rotation of the annulus gear 162 causes the planetary pinion gears 166 to rotate, and in turn, causing rotation of the planetary carrier 172. Since the planetary carrier 172 is splined at 178 to the input shaft 170, the input shaft 170 rotates due to rotation of the planetary carrier 172. Thus, torque is imparted to the input shaft 170 via the compounding gear assembly 120. It should be appreciated that the stator blades 186 and sun gear 180 are held stationary via the first and second one way clutches 192 and 204, relative to the stator reaction member 196 and stationary reaction shaft 200.

However, during normal upshifted operation of the input compounding torque converter 112, the lock-up piston 220 is applied. Fluid pushes the lock-up piston 220 against the front cover member 124 with the friction disc 228 sandwiched between the two elements. The flow of power or engine torque is then transmitted through the front cover member 124, the lock-up piston 220 and torsional isolation mechanism, in turn, to the planetary carrier 172. Rotation of the planetary carrier 172 will cause the sun gear 180 to free wheel in the direction of rotation of the impeller assembly 114 via the second one way clutch 204. Thus, the turbine assembly 116, planetary carrier 172 and input shaft 170 rotate together. It should be appreciated that the stator assembly 118 will also free wheel in the direction of rotation of the impeller assembly 114 via the first one way clutch 192. It should also be appreciated that the flow of power is reversed during engine braking.

Accordingly, the input compounding torque converter 12,112 provides a two speed fluid coupling and a relatively simple, low cost form of compounder. The input compounding torque converter 12,112 multiplies engine torque to allow lower torque engines to mate with higher capacity transmissions. The input compounding torque converter 12,112 may use lockup operation for engine braking. Also, when locked, the compounding gear assembly 20,120 provides a direct gear drive and not an overdrive. Further, the planetary carrier 72,172 is also connectable directly to the engine by way of lock-up clutch assembly 80,120, such that clutch engagement provides direct drive through the input compounding torque converter 12,112 bypassing both the hydrodynamic and mechanical torque multiplication. Additionally, the stator assembly 118 and one-way clutch 192 may be optional and not used when the input compounding torque converter 112 is utilized as an input compounding fluid coupling. Finally, the input compounding torque converter 12,112 accomplishes torque compounding or multiplication with one planetary gearset and two free-wheels.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described. Foreseeable applications include use with high torque engines where transmission limitations are protected by engine control and/or reduced hydrodynamic torque multiplication.

What is claimed is:

1. An input compounding torque converter for converting and multiplying torque from a prime mover to an input shaft of a transmission, said input compounding torque converter comprising:

an impeller operatively connected for rotation with a prime mover;

a turbine fluidly connected in driving relationship with said impeller for receiving torque from said impeller;

a stator fluidly connected between said impeller and said turbine;

a planetary gear assembly interconnecting said turbine and an input shaft of a transmission for multiplying torque from said turbine to the input shaft;

said planetary gear assembly including an annulus gear connected to said turbine, a planetary carrier connected to the input shaft, a sun gear, and a plurality of planetary pinion gears rotatably supported on said planetary carrier and engaging said sun and annulus gears;

means for locking and unlocking said planetary carrier and the input shaft to the prime mover to provide a single path for transmitting torque from the prime mover to the input shaft through said planetary carrier during locking operation and from said turbine to said planetary carrier through said planetary gear assembly during unlocking operation;

a first one way clutch for holding stationary said stator against rotation in the direction of said impeller and allowing freewheeling motion of said stator in the opposite direction of said impeller, said first one way clutch including a plurality of rollers;

a second one way clutch for holding stationary said sun gear against rotation in a direction opposite of said impeller and allowing freewheeling motion of said sun gear in the same direction as said impeller, said second one way clutch including a plurality of rollers spaced radially with respect to said rollers of said first one way clutch; and a stationary reaction member fixedly secured to a stationary portion of the transmission and including an intermediate portion disposed between said radially spaced rollers of said first and second one way clutches.

2. An input compounding torque converter as set forth in claim 1 wherein said intermediate portion of said stationary reaction member has at least one race surface corresponding to either one of said rollers of said first and second one way clutches.

3. An input compounding torque converter as set forth in claim 2 wherein said first one way clutch includes a stator camming surface disposed opposite said at least one race surface of said intermediate portion with said rollers disposed therebetween, said stator camming surface preventing rotation of said stator in the direction of rotation of said impeller and allowing freewheeling motion of said stator in the opposite direction from said impeller.

4. An input compounding torque converter as set forth in claim 3 wherein said rollers of said first one way clutch being urged into engagement with said stator camming surface to hold said stator against rotation in the direction of rotation of said impeller but movable out of engagement with said stator camming surface to allow freewheeling motion of said stator in the opposite direction.

5. An input compounding torque converter as set forth in claim 2 wherein said second one way clutch includes a sun gear camming surface disposed on either one of sun gear and said intermediate portion and a second race surface disposed on the other one of said sun gear and said intermediate portion with said rollers disposed therebetween, said sun gear camming surface preventing rotation of said sun gear in the direction opposite said impeller and allowing freewheeling motion of said sun gear in the same direction as said impeller.

6. An input compounding torque converter as set forth in claim 5 wherein said rollers of said second one way clutch being urged into engagement with said sun gear camming surface to hold said sun gear against rotation in a direction opposite said impeller but movable out of engagement with said sun gear camming surface to allow freewheeling motion of said sun gear in the direction of said impeller.

7. An input compounding torque converter as set forth in claim 1 including a front cover connected to said impeller and rotatingly drivingly engageable with the prime mover, said means for locking and unlocking said planetary carrier including a piston member operatively interconnected to said planetary carrier and movable between engaged and disengaged positions relative to said front cover to provide a single path for transmitting torque from the prime mover to the input shaft.

8. An input compounding torque converter as set forth in claim 7 wherein said means for locking and unlocking said planetary carrier further includes a torsional isolation mechanism interconnecting said piston member and said planetary carrier.

9. An input compounding torque converter as set forth in claim 8 wherein said front cover includes a friction disk disposed on one side thereof for frictionally engaging said piston when it is in said engaged position.

10. An input compounding torque converter for converting and multiplying torque from a prime mover to an input shaft of a transmission, said input compounding torque converter comprising:

an impeller operatively connected for rotation with a prime mover;

a turbine fluidly connected in driving relationship with said impeller for receiving torque from said impeller;

a stator fluidly connected between said impeller and said turbine;

a planetary gear assembly interconnecting said turbine and an input shaft of a transmission for multiplying torque from said turbine to the input shaft;

said planetary gear assembly including an annulus gear connected to said turbine, a planetary carrier connected to the input shaft, a sun gear, and a plurality of planetary pinion gears rotatably supported on said planetary carrier and engaging said sun and annulus gears;

means for locking and unlocking said planetary carrier and the input shaft to the prime mover to provide a single path for transmitting torque from the prime mover to the input shaft through said planetary carrier during locking operation and from said turbine to said planetary carrier through said planetary gear assembly during unlocking operation;

a first one way clutch for holding stationary said stator against rotation in the direction of said impeller and allowing freewheeling motion of said stator in the opposite direction of said impeller, said first one way clutch including a plurality of rollers;

a second one way clutch for holding stationary said sun gear against rotation in a direction opposite of said impeller and allowing freewheeling motion of said sun gear in the same direction as said impeller, said second one way clutch including a plurality of rollers spaced radially with respect to said rollers of said first one way clutch;

a stationary reaction member fixedly secured to a stationary portion of the transmission and including an intermediate portion disposed between said radially spaced rollers of said first and second one way clutches; and a front cover connected to said impeller and rotatingly drivingly engageable with the prime mover, said means for locking and unlocking said planetary carrier including a piston member operatively connected to said planetary carrier and movable between engaged and disengaged positions relative to said front cover to provide a single path for transmitting torque from the prime mover to the input shaft.

11. An input compounding torque converter as set forth in claim 10 wherein said intermediate portion of said stationary reaction member has a first race surface corresponding to said rollers of said first one way clutch and a sun gear camming surface corresponding to said rollers of said second one way clutch.

12. An input compounding torque converter as set forth in claim 11 wherein said first one way clutch includes a stator camming surface disposed opposite said first race surface on said intermediate portion with said rollers disposed therebetween, said stator camming surface preventing rotation of said stator in the direction of rotation of said impeller and allowing freewheeling motion of said stator in the opposite direction from said impeller.

13. An input compounding torque converter as set forth in claim 12 wherein said second one way clutch includes said sun gear camming surface disposed on said intermediate portion and a second race surface disposed on a portion of said sun gear with said rollers disposed therebetween, said sun gear camming surface preventing rotation of said sun gear in the direction opposite said impeller and allowing freewheeling motion of said sun gear in the same direction as said impeller.

14. An input compounding torque converter as set forth in claim 13 wherein said rollers in said first one way clutch being urged into engagement with said stator camming surface to hold said stator against rotation in the direction of rotation of said impeller but movable out of engagement with said stator camming surface and against the bias to allow freewheeling motion of said stator in the opposite direction.

15. An input compounding torque converter as set forth in claim 14 wherein said rollers of said second one way clutch being urged into engagement with said sun gear camming surface to hold said sun gear against rotation in a direction opposite said impeller but movable out of engagement with said sun gear camming surface and against the bias to allow freewheeling motion of said sun gear in the direction of said impeller.

16. An input compounding torque converter as set forth in claim 15 including a plurality of springs for urging said rollers of said first and second one way clutches into engagement with the respective camming surfaces.

17. An input compounding torque converter for converting and multiplying torque from a prime mover to an input shaft of a transmission, said input compounding torque converter comprising:

an impeller operatively connected for rotation with a prime mover;

a turbine fluidly connected in driving relationship with said impeller for receiving torque from said impeller;

a stator fluidly connected between said impeller and said turbine;

a planetary gear assembly interconnecting said turbine and an input shaft of a transmission for multiplying torque from said turbine to the input shaft;

said planetary gear assembly including an annulus gear connected to said turbine, a planetary carrier connected to the input shaft, a sun gear, and a plurality of planetary pinion gears rotatably supported on said planetary carrier and engaging said sun and annulus gears;

means for locking and unlocking said planetary carrier and the input shaft to the prime mover to provide a single path for transmitting torque from the prime mover to the input shaft through said planetary carrier during locking operation and from said turbine to said planetary carrier through said planetary gear assembly during unlocking operation;

a first one way clutch for holding stationary said stator against rotation in the direction of said impeller and allowing freewheeling motion of said stator in the opposite direction of said impeller, said first one way clutch including a plurality of rollers;

a second one way clutch for holding stationary said sun gear against rotation in a direction opposite of said impeller and allowing freewheeling motion of said sun gear in the same direction as said impeller, said second one way clutch including a plurality of rollers spaced radially with respect to said rollers of said first one way clutch;

a stationary reaction member fixedly secured to a stationary portion of the transmission and including an intermediate portion disposed between said radially spaced rollers of said first and second one way clutches;

said intermediate portion of said stationary reaction member providing a first race surface corresponding to said rollers of said first one way clutch and a sun gear camming surface corresponding to said rollers of said second one way clutch;

said first one way clutch including a stator camming surface disposed opposite said first race surface on said intermediate member with said rollers disposed therebetween, said stator camming surface preventing rotation of said stator in the direction of rotation of said impeller and allowing freewheeling motion of said stator in the opposite direction from said impeller; and said second one way clutch including said sun gear camming surface disposed on said intermediate member and a second race surface disposed on a race member connected to said sun gear with said rollers disposed therebetween, said sun gear camming surface preventing rotation of said sun gear in the direction opposite said impeller and allowing freewheeling motion of said sun gear in the same direction as said impeller.

18. An input compounding torque converter as set forth in claim 17 including a front cover connected to said impeller and rotatingly drivingly engageable with the prime mover.

19. An input compounding torque converter as set forth in claim 18 wherein said means for locking and unlocking said planetary carrier includes a piston member operatively interconnected to said planetary carrier and movable between engaged and disengaged positions relative to said front cover, a torsional isolation mechanism interconnecting said piston member and said planetary carrier, said front cover including a friction disc disposed on one side thereof for frictionally engaging said piston when said piston is moved in an engaged position to provide a single path for transmitting torque from the prime mover to the input shaft.

20. An input compounding torque converter as set forth in claim 19 including a plurality of leaf springs for urging said rollers of said first and second one way clutches into engagement with the respective camming surfaces.

* * * * *